United States Patent
Murakami et al.

(10) Patent No.: US 7,242,926 B1
(45) Date of Patent: Jul. 10, 2007

(54) COMMUNICATION DEVICE AND COMMUNICATION SYSTEM

(75) Inventors: Minoru Murakami, Ome (JP); Motoaki Sakurai, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 38 days.

(21) Appl. No.: 09/635,011

(22) Filed: Aug. 9, 2000

(30) Foreign Application Priority Data

Aug. 31, 1999 (JP) .................................. 11-245737

(51) Int. Cl.
*H04M 1/663* (2006.01)

(52) U.S. Cl. .................................. 455/414.2; 455/414.1

(58) Field of Classification Search ................ 455/556, 455/575, 425, 525, 426, 412, 422, 566, 414, 455/344, 435, 456.3, 414.2, 552, 423; 709/206, 709/229; 342/357.01, 357.09, 357.1, 357.12
See application file for complete search history.

(56) References Cited

U.S. PATENT DOCUMENTS

| | | | |
|---|---|---|---|
| 5,790,974 A | | 8/1998 | Tognazzini |
| 6,006,089 A | * | 12/1999 | Sasaki et al. ................ 455/423 |
| 6,233,452 B1 | * | 5/2001 | Nishino .................... 455/435.2 |
| 6,370,568 B1 | * | 4/2002 | Garfinkle ..................... 709/206 |
| 6,434,403 B1 | * | 8/2002 | Ausems et al. ............. 455/556 |
| 6,535,243 B1 | * | 3/2003 | Tullis ....................... 348/207.1 |
| 6,564,070 B1 | * | 5/2003 | Nagamine et al. ........ 455/556.1 |
| 6,600,930 B1 | * | 7/2003 | Sakurai et al. ........... 455/414.3 |
| 2002/0171581 A1 | * | 11/2002 | Sheynblat et al. ...... 342/357.09 |

FOREIGN PATENT DOCUMENTS

| | | |
|---|---|---|
| EP | 0 734 189 | 9/1996 |
| EP | 0 833 494 A2 | 4/1998 |
| WO | WO 99/17230 | 4/1999 |

* cited by examiner

*Primary Examiner*—Edward F. Urban
*Assistant Examiner*—Tu X. Nguyen
(74) *Attorney, Agent, or Firm*—Frishauf, Holtz, Goodman & Chick, P.C.

(57) ABSTRACT

A communication device comprises a key input section for inputting a mail document and a control section for selecting from a plurality of images stored in a ROM a stamp image or a postcard image specific to an area corresponding to a CS-ID obtained through a position registration process carried out with the nearest cell station CS and for attaching the selected image to the created mail document for transmission.

6 Claims, 5 Drawing Sheets

COMMUNICATION DEVICE AND COMMUNICATION SYSTEM

CROSS-REFERENCE TO RELATED APPLICATIONS

This application is based upon and claims the benefit of priority from prior Japanese Patent Application No. 11-245737, filed Aug. 31, 1999, the entire contents of which are incorporated herein by reference.

BACKGROUND OF THE INVENTION

The present invention relates to a communication device such as a PHS terminal which provides not only a function for communicating mail documents but also a function for communicating information specific to the current position, as well as a communication system using such a communication device.

Recent digital cellular telephones and PHS (Personal Handyphone System: second-generation codeless telephone system) terminals can transmit not only voices but also mail documents or handwritten images. In creating and transmitting mail documents, addition of information specific to the current position of the terminal (for example, an image representing a scene peculiar to that region) makes the mail document appear attractive to please the receiver.

However, whether the image attached to the mail document is manually created or selected from a plurality of prepared images, the creation or selection of the attached image requires much time and labor even if the mail document is simple. This disadvantageously dampens the sender's mood to transmit the mail document easily.

BRIEF SUMMARY OF THE INVENTION

Accordingly, it is an object of the present invention to provide communication device and communication system that enable a sender to select information depending on the current position of the sender's communication terminal device and attach it to a mail document for transmission.

According to the present invention, there is provided a communication device comprising mail creation means for creating an electronic mail, means for detecting the current position of the communication device, and transmission means for attaching information corresponding to the current position to the electronic mail and transmitting the electronic mail with the information being attached.

According to the present invention, there is provided another radio communication system comprising a communication terminal, and a cell station connecting to the communication terminal via a radio channel, wherein the communication terminal comprises mail creation means for creating an electronic mail, means for detecting the current position of the communication device, and transmission means for attaching information corresponding to the current position to the electronic mail and transmitting the electronic mail with the information being attached.

According to the present invention, there is provided a still another radio communication system comprising a communication terminal, and a cell station connecting to the communication terminal via a radio channel, wherein the communication terminal comprises mail creation means for creating an electronic mail, means for detecting the current position of the communication device, and transmission means for attaching position information indicating the current position to the electronic mail and transmitting the electronic mail with the position information being attached to the cell station, and the cell station comprises means for attaching regional information corresponding to the current position based on the position information and for transmitting the electronic mail with the regional information being attached.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of the present invention will now be described with reference to the accompanying drawings.

First Embodiment

Figure 1:
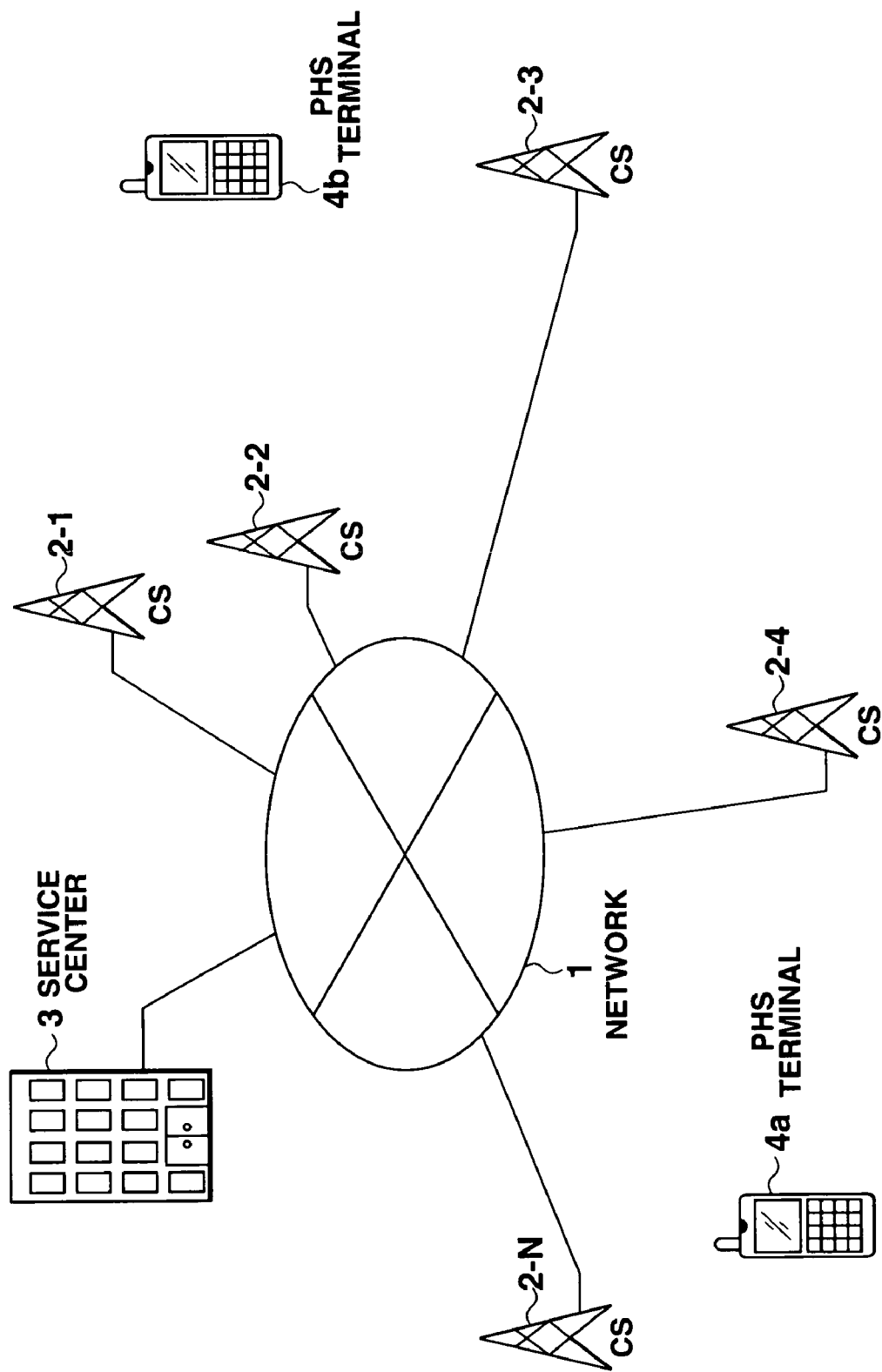
FIG. 1 is a view showing the entire configuration of a communication system according to a first embodiment of the present invention.

FIG. 1 shows the configuration of a communication system according to the first embodiment where the present invention is applied to a communication service (in this case, the PHS) that can transmit and receive regional images and mail documents using bit maps. A large number of PHS cell stations (CS) 2-1, 2-2, 2-N are connected to a network (the PSTN, the ISDN, or the like), and a service center operated by a service company that provides services for transmitting regional images and mail documents through the PHS is also connected to the network.

The PHS terminals (only two are shown, but the number is not limited to two) 4a and 4b can each communicate by executing a position registration process with one of the cell stations 2-1, 2-2, . . . 2-N. The PHS terminals 4a and 5b are adapted for communication services for enabling regional images and mail documents to be transmitted and received and are registered in the service center 3 by contracting with the service company.

Figure 2:
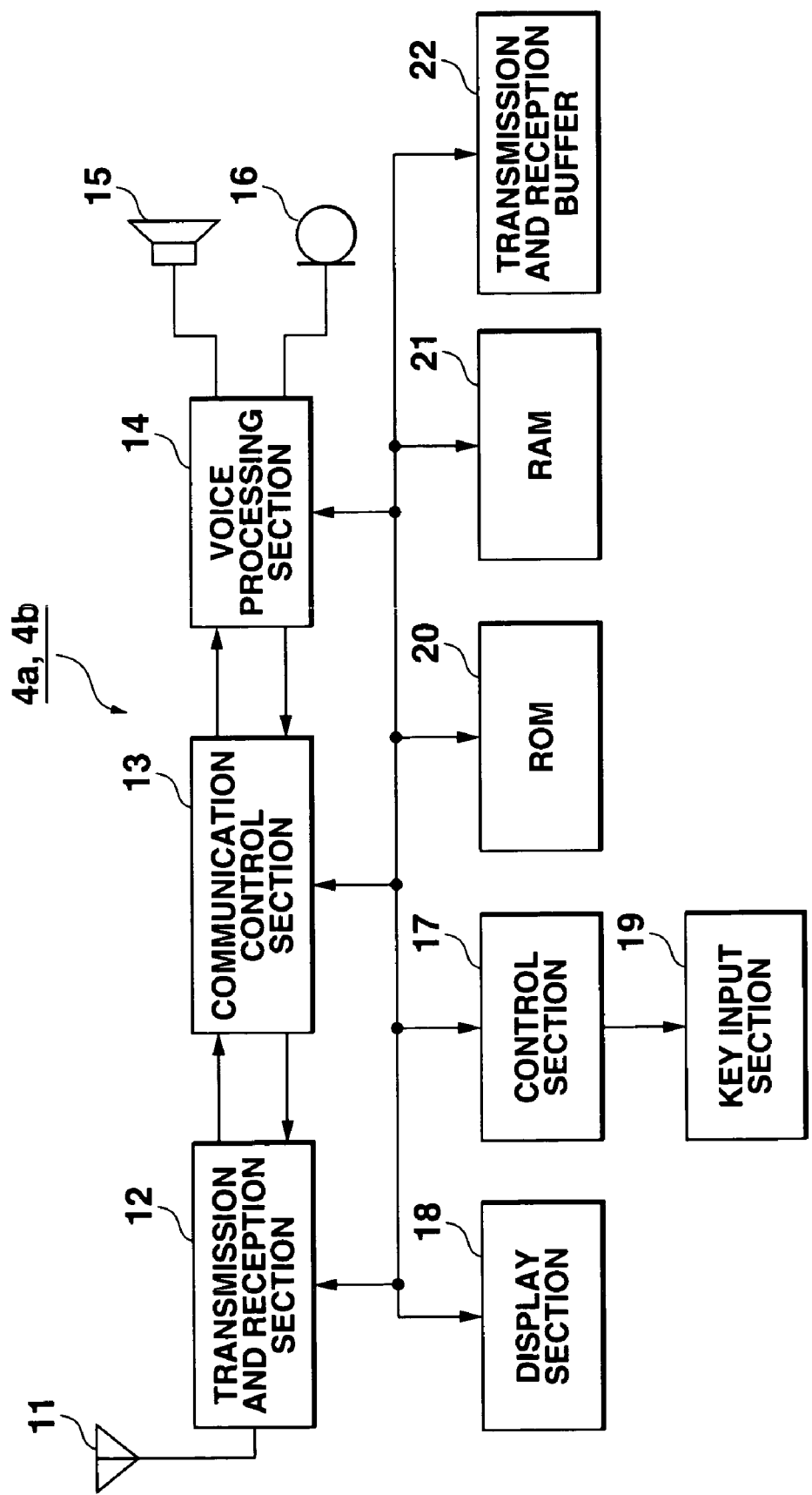
FIG. 2 is a block diagram showing the configuration of a circuit in a PHS terminal according to the first embodiment.

FIG. 2 shows the configuration of a circuit in each of the PHS terminal 4a and 4b. A transmission and reception section 12 is connected to an antenna 11. Although not shown, the transmission and reception section 12 comprises an antenna switch for assigning transmissions/receptions to corresponding addresses, a frequency conversion section for converting frequency between radio signals and IF signals, and a modem.

The frequency conversion section accepts inputs via the antenna switch of signals received by the antenna 11 and converts a radio signal in a 1.9-GHz zone into an IF signal in a 1-MHz zone by mixing the signal with a local oscillation signal of a predetermined frequency output from a PLL synthesizer, not shown. The IF signal is supplied to the modem. On the other hand, the frequency conversion section mixes a π/4 shift GPSK modulated wave (the IF signal) with a local oscillation signal of a predetermined frequency output from the PLL synthesizer, to convert the IF signal in the 1-MHz zone into the radio signal in the 1.9-GHz zone, and then emits the signal from the antenna 11 via the antenna switch.

The modem demodulates the IF signal from the frequency conversion section to separate it into I and Q data, which are then transferred to a communication control section 13. On the other hand, the modem generates the I and Q data from the data transferred from the communication control section 13 and subjects the data to the π/4 shift QPSK conversion before outputting them to the frequency conversion section.

The communication control section 13 is connected to the transmission and reception section 12 and a voice processing section 14 is connected to the communication control section 13. A receiving speaker 15 and a transmitting microphone 16 is connected to the voice processing section 14.

The communication control section 13 executes frame synchronization and slot data formatting. The receiver uses a predetermined timing to obtain one slot of data from received data transmitted from the modem of the transmission and reception section 12, extracts a unique word (a synchronization signal) from the data for frame synchronization, descrambles control data, voice data, or communication data, and transmits the control and communication data to a control section 17, described later, while transferring the voice data to the voice processing section 14.

On the other hand, the sender adds control data to the voice data transmitted from the voice processing section 14 or to the communication data transmitted from the control section 17, to scramble these data, subsequently adds a unique word or the like to the data to create one slot of transmitted data, then inserts the data into a predetermined slot within a frame using a predetermined timing, and finally transmits the data to the modem of the transmission and reception section 12.

The voice processing section 14 comprises a speech CODEC and a PCM CODEC. The speech CODEC compresses/expands digital data. The receiver expands an ADPCM voice signal (4 bits×8 KHz=32 Kbps) transmitted from the communication control section 13, by decoding it into a PCM voice signal (8 bits×8 KHz=64 Kbps), and then outputs the expanded signal to the PCM CODEC. On the other hand, the sender compresses the PCM voice signal transmitted from the PCM CODEC, by coding it into the ADPCM voice signal, and then outputs the compressed signal to the communication control section 13.

In addition, the PCM CODEC executes an analog/digital conversion process. The receiver subjects a PCM voice signal transmitted from the speech CODEC to a D/A conversion and outputs the obtained analog voice signal to the speaker 15. On the other hand, the sender subjects the analog voice signal input from the microphone 16 to an A/D conversion to obtain the PCM voice signal and outputs it to the speech CODEC.

The transmission and reception section 12, communication control section 13, and voice processing section 14 are connected to the control section 17, which connects to a display section 18, key input section 19, ROM 20, RAM 21, and transmission and reception buffer 22.

The control section 17 comprises a CPU or the like to control the entire device based on a predetermined program stored in the ROM 20. The ROM 20 stores programs for control operations such as communication controls, speech data transmissions and receptions, and creation and transmission of mail documents and regional images which are all executed by the control section 17, character pattern data corresponding to a character text code, regional image data as stamp images which correspond to areas to which identification information (hereafter simply referred to as "CS-ID") on the cell stations 2-1, 2-2, . . . 2-N throughout Japan is assigned (the regional image data indicates a scene, a logo mark, or the like of each area), and other data.

The RAM 21 has a work area for temporarily storing various data used by the control section 17 for controls, a mail area that stores predetermined numbers of various mail data including transmitted voice data, character text data, and image data, and a directory area that stores sets of destinations and their telephone numbers or mail addresses.

The display section 18 comprises a dot matrix liquid-crystal display panel with a back light which can display, for example, binary image data of 130×192 dots, and a drive circuit for the display panel.

The key input section 19 has a dial key, a "send" key, an "off" key, a mode selection key, a cursor key, and other keys for inputting to the control section 17 a key operation signal for setting a corresponding function.

The transmission and reception buffer 22 comprises a transmission buffer area and a reception buffer area which buffers data to be transmitted and received, respectively.

The operation of this embodiment will be described below.

In this embodiment, a user selects as a sending mode either a normal mode that operates to transmit the mail document as it is and a stamp attachment mode that automatically selects as a stamp image (information specific to the area) a regional image corresponding to the CS-ID on the nearest cell station 2 and attaching the selected image to the mail document for transmission.

Figure 3:
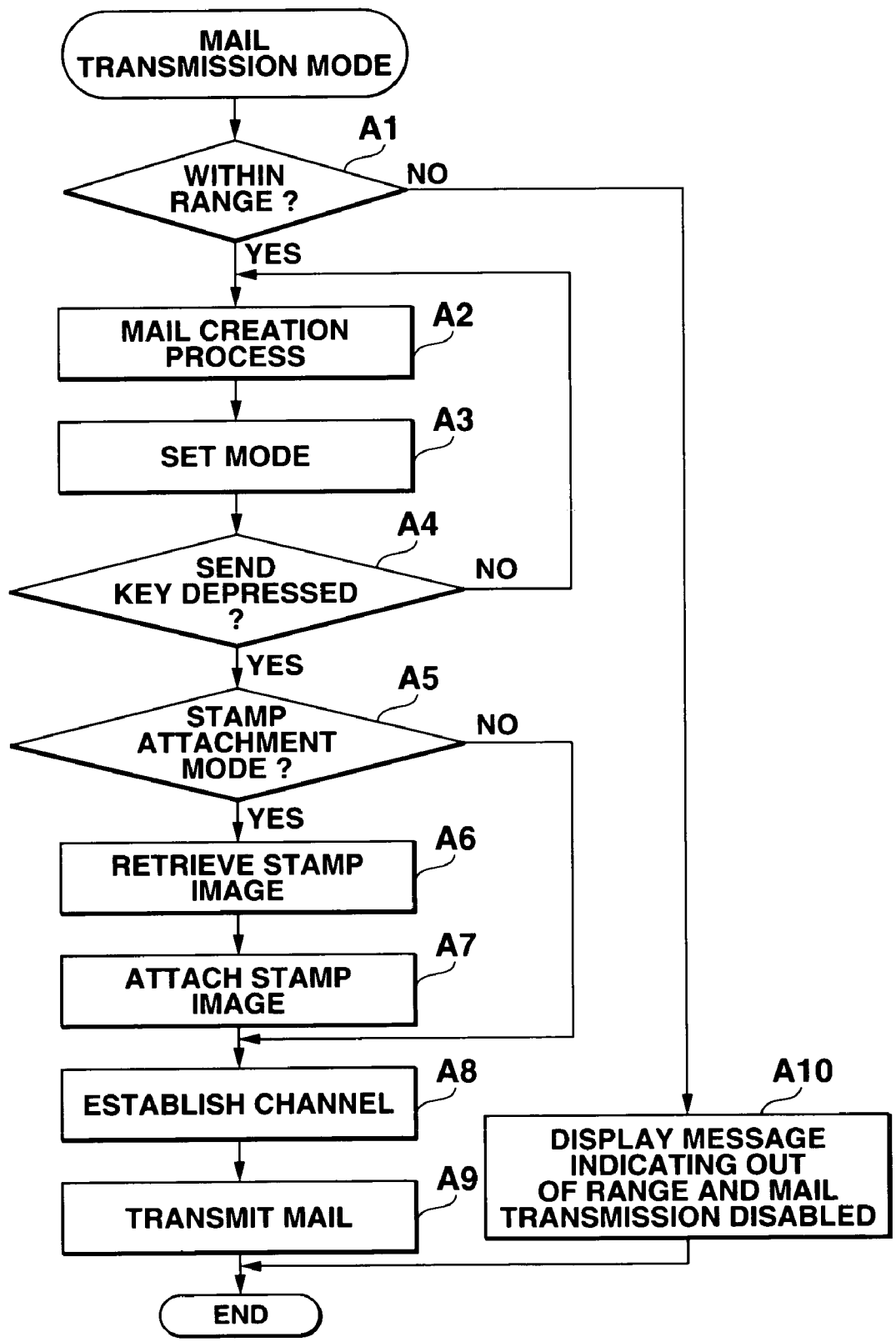
FIG. 3 is a flow chart showing a process carried out in a mail creation mode according to the first embodiment of the present invention.

FIG. 3 illustrates a process executed by the PHS terminal 4a or 4b if the mode selection key of the key input section 19 is used to select the mail sending mode.

It is determined whether or not the PHS terminal is located within a corresponding communication range (step A1). If it is not located within the communication range, a created mail document cannot be transmitted, so that the display section 18 displays a guide message, for example, "Out of communication range. You can't send mail. Move into communication range" (step A10) and the speaker 15 emits an intermittent beep sound. Thus, the process is ended and waits for the user to move into the communication range.

If the PHS terminal is determined to be located within the range where it can communicate with a certain cell station, the CS-ID on the cell station 2, that is, its identification information, is temporarily held in a register for the work area of the RAM 21 as positional information indicating the current position of the terminal. A mail creation process corresponding to a key input on the key input section 19 is sequentially executed. Then, the user specifies the destination of the mail document by using the cursor key to select one of the telephone numbers or mail addresses registered in the directory area of the RAM 21, or using the dial key of the key input section 19 to directly input a telephone number or mail address (the mail creation process: step A2).

The user uses the key input section 19 to determine whether a stamp is to be attached to this mail document (that is, select and set either a stamp attachment mode or a normal mode) (step A3), operates the "send" key of the key input section 19 to complete the creation of the mail document, and waits for a command for a transmission of the created mail document (step A4).

When the "send" key is determined to have been operated, it is determined whether or not the stamp attachment mode has been set (step A5).

If the stamp attachment mode has not been set, that is, the normal mode has been set, the communication channel to one of the cell stations is established (step A8), the above described created mail document is transmitted (step A9), and the process returns to a normal standby mode.

If the stamp attachment mode is has been set at step A5, the CS-ID temporarily held in the register for the work area of the RAM 21 is used to search the ROM 20 for a stamp image for a corresponding area (step A6), and the read stamp image is attached to the created mail document (step A7).

Then, the communication channel to one of the cell stations is established (step A8), and the created mail with the stamp image attached thereto is transmitted after holding it in the transmission buffer of the transmission and reception buffer 22 (step A9). Subsequently, the channel is disconnected and the process returns to the normal standby mode.

In this manner, the regional image corresponding to the area where the mail document sender is located is automatically selected and attached to the mail document for transmission, thereby enabling easy transmission of the mail document with the image attached thereto and corresponding to the current position, without the needs for much time and labor. Consequently, the transmitted mail is sent to the destination terminal via the network and then displayed on the display section of the destination terminal. If the received mail has the stamp image attached thereto, the stamp image is displayed at a predetermined position (for example, in an upper left corner) of a display screen on which the mail document is displayed. As a result, the mail appears like an actual postcard and thus appears attractive.

Although the above embodiment fixedly stores the attached stamp images in the ROM 20, the present invention is not limited to this. For example, a stamp image corresponding to the CS-ID may be downloaded from the service center or the cell station and stored in the memory. Then, each time the stamp images are updated, the new stamp image can be obtained.

In addition, if the stamp image is downloaded once the CD-ID of the area has been obtained (that is, once a control channel to the cell station has been successfully established upon power-on or after the user's movement), the memory for the stamp images is not required. Additionally, since the stamp image cannot be downloaded unless the user visits the corresponding area, the stamp image has an excellent locality and scarcity value.

Furthermore, a default mode may be set beforehand instead of setting the above described mode (the normal mode or the stamp attachment mode) whenever a mail document is created. It is contemplated that the stamp attachment mode may be normally set to attach the stamp image to all transmitted mail documents and that the attachment of the stamp image may be exceptionally omitted. Alternatively, a stored or obtained stamp image may be displayed and checked before the mail creation process is executed or while it is being executed. Then, the user is encouraged to add a comment on the stamp image to the mail document to enrich the mail document.

Second Embodiment

According to the second embodiment, the configuration of the entire system is almost the same as that in FIG. 1, and the circuit configuration of the PHS terminals is the almost same as that in FIG. 2. Thus, the same components are denoted by the same reference numerals and illustration and description thereof is omitted.

In the first embodiment, the ROM 20 of each of the PHS terminals 4*a* and 4*b* stores the regional image data as the stamp images which corresponds to the areas to which the CS-ID on the cell stations 2-1, 2-2, . . . 2-N throughout Japan is assigned, but in the second embodiment, such data are not stored in the ROM 20 but the service center 3 stores image data as picture postcard images which corresponds to the areas to which the CS-ID on the cell stations 2-1, 2-2, . . . 2-N throughout Japan is assigned. In the first embodiment, the image data are stored in the terminals, so that they must be small-sized and is thus called "stamp images". In the second embodiment, the stored image size is not limited, so that the image data are called "postcard data" because postcards are larger than stamps.

Next, the operation of the above described embodiment will be explained.

In this embodiment, a user also selects as the sending mode either the normal mode that operates to transmit the mail document as it is and the postcard attachment mode that automatically selects as a postcard image (information specific to the area) a regional image corresponding to the CS-ID on the nearest cell station 2 and attaching the selected postcard image to the mail document for transmission.

Figure 4:
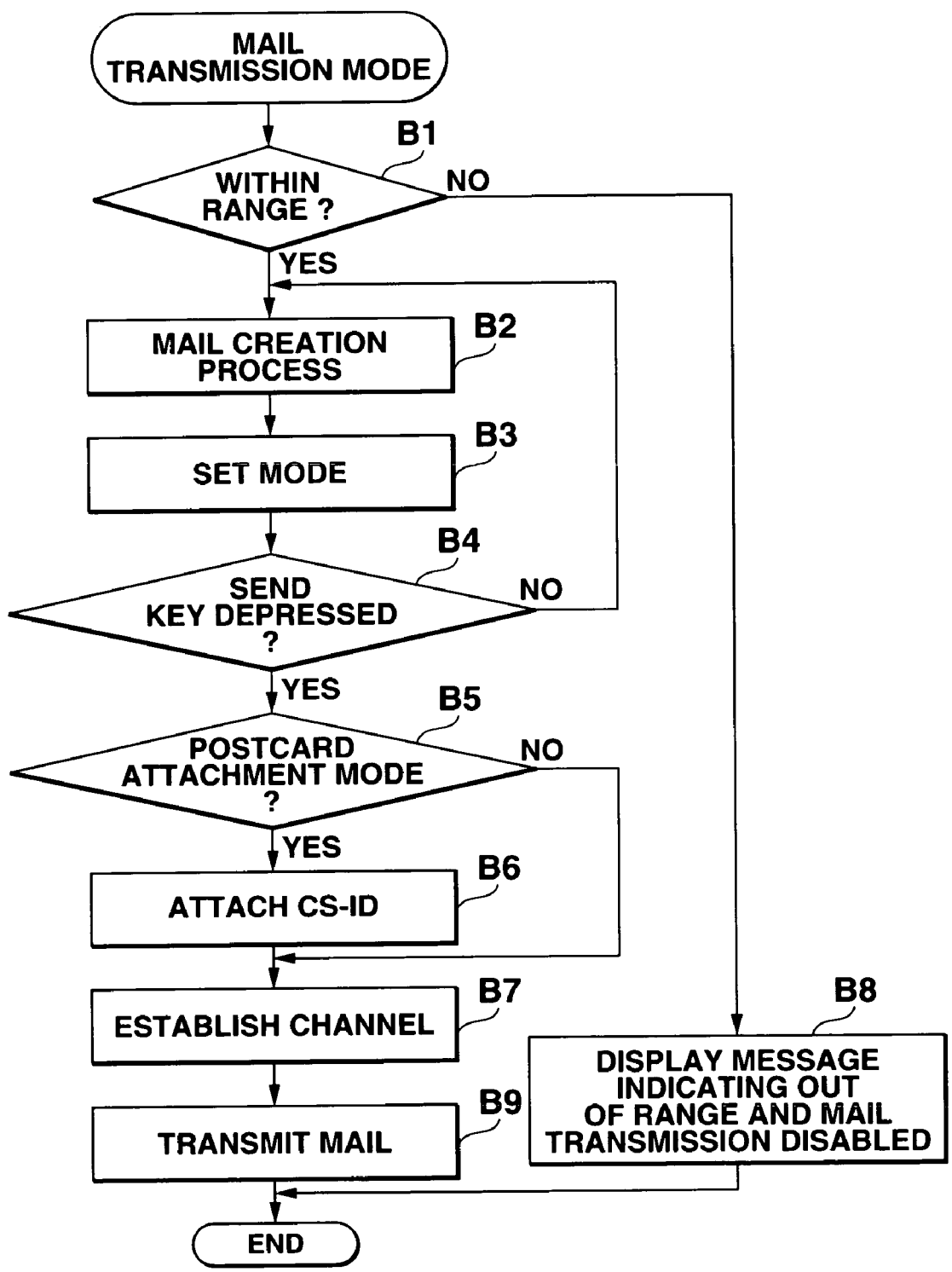
FIG. 4 is a flow chart showing how a mail is created with a PHS terminal according to a second embodiment of the present invention.

FIG. 4 illustrates a process executed by the PHS terminal 4*a* or 4*b* if the mode selection key of the key input section 19 is used to select the mail sending mode.

It is determined whether or not the PHS terminal is located within a corresponding communication range (step B1). If it is not located within the communication range, a created mail document cannot be transmitted, so that the display section 18 displays a guide message, for example, "Out of communication range. You can't send mail. Move into communication range" (step B8) and the speaker 15 emits an intermittent beep sound. Thus, the process is ended and waits for the user to move into the communication range.

If the PHS terminal is determined to be located within a range where it can communicate with a certain cell station, the CS-ID on the cell station 2, that is, its identification information, is temporarily held in the register for the work area of the RAM 21 as positional information indicating the current position of the terminal. A mail creation process corresponding to a key input on the key input section 19 is sequentially executed. Then, the user specifies the destination of the mail document by using the cursor key to select one of the telephone numbers or mail addresses registered in the directory area of the RAM 21, or using the dial key of the key input section 19 to directly input a telephone number or mail address (the mail creation process: step B2).

The user uses the key input section 19 to determine whether a postcard is to be attached to this mail document (that is, select and set either a postcard attachment mode or the normal mode) (step B3), operates the "send" key of the key input section 19 to complete the creation of the mail document, and waits for a command for a transmission of the created mail document (step B4).

When the "send" key has been operated, it is determined whether or not the postcard attachment mode has been set (step B5).

If the postcard attachment mode has not been set, that is, the normal mode has been set, the communication channel to one of the cell stations is established (step B7), the above described created mail document is transmitted (step B9), and the process returns to the normal standby mode.

If the postcard attachment mode has been set at step B5, the CS-ID temporarily held in the register for the work area of the RAM 21 is attached to the above described created mail document (step B6), the communication channel to one of the cell stations is established (step B7), the mail is transmitted (step B9), and the process returns to the normal standby mode.

Figure 5:
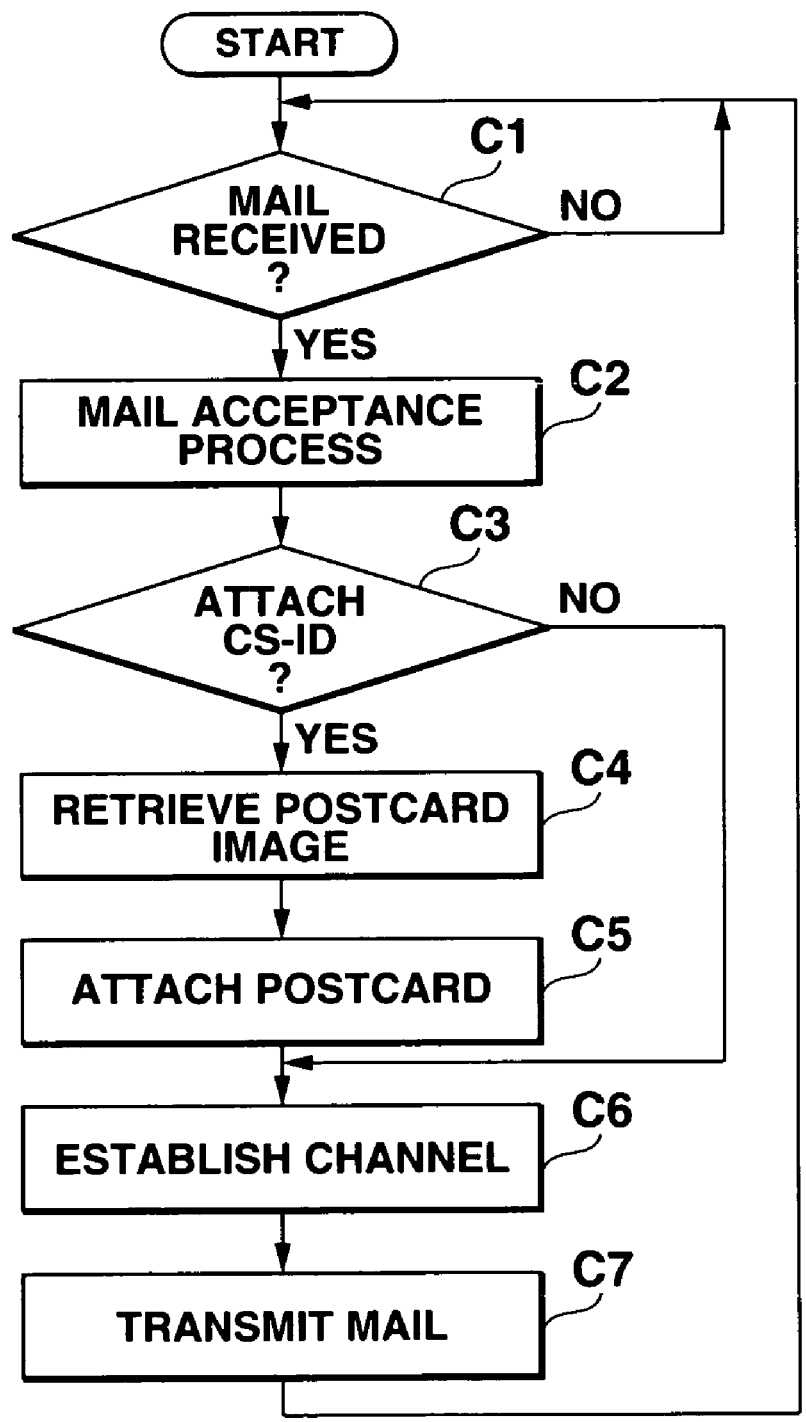
FIG. 5 is a flow chart showing how mail documents are received at a service center according to the second embodiment of the present invention.

The service center 3, which accepts transmissions from the PHS terminals 4a and 4b, carries out a process for relay of mail documents as shown in FIG. 5.

First, the service center 3 waits for a mail document to be received from a PHS terminal registered therewith for services (step C1). Upon determining that a mail document has been received, the service center 3 executes an acceptance process (step C2).

It is then determined whether or not a CS-ID has been attached to the accepted mail document (step C3). If no CD-ID has been attached to the mail document, the communication channel to the destination is established (step C6), the mail document is transmitted to the PHS terminal of the mail destination (step C7) to complete the series of relay process. The service center 3 then returns to the standby state at step C1.

Alternatively, if the service center 3 determines that a CS-ID has been attached to the mail document (step C3), it reads image data with the same CS-ID from the image data on the postcard images stored therein in a fashion corresponding to the areas of Japan to each of which the corresponding CS-ID is assigned (step C4), and attaches the read image data to the mail document as a postcard image (step C5).

The service center establishes the channel to the destination (step C6), transmits the mail with the postcard attached thereto (step C7), subsequently disconnects the channel, and then returns to the standby state at step C1.

In this manner, upon receiving the mail document, the service center 3 automatically selects the image corresponding to the current position of the mail document sender and attaches the selected image to the mail document before transmitting the mail document to the destination. Consequently, the mail sender can transmit the mail document with the image suitable for that area attached thereto, without the needs for much time and labor. If the received mail has a postcard image attached thereto, the postcard image is displayed as the first page of the mail document. As a result, the mail appears like an actual postcard and thus appears attractive.

According to this embodiment, since a large number of images need not be stored in the PHS terminal and the service center 3, which accepts transmitted mail documents, attaches the image, the PHS terminals 4a and 4b can easily transmit mail documents and do not require a memory or the like for storing a large number of images, thereby enabling the scale of the circuit to be reduced.

In addition, in the first and second embodiments, the stamp or postcard image corresponding to the CS-ID is selected, but a plurality of images corresponding to the same CS-ID may be provided so that one of them can be selected randomly or depending on the age, sex, favor, preference, or the like of the PHS terminal user.

In particular, if the service center 3, which is not limited in the capacity of a medium for storing images, provides such a service as to allow the user to select the image taking the time (the season) into consideration, the contents of the service can be easily applied to the user, thereby contributing to an increase in the number of service subscribers.

Furthermore, the image information attached to the mail may be advertisements of companies. It is contemplated that the communication service is sponsored by a company and that an advertisement image specific to the area may be attached to the mail document for transmission to deduct part or all of a mail transmission rate. In addition, in the above described embodiments, the information attached to the mail is the images, but the present invention is not limited to this and multimedia information (sentences, voices, animations, or the like) may be used.

In the first and second embodiments, the CS-ID of the nearest cell station 2 that is obtained by the PHS terminal during the normal position registration process is used as a means for identifying the position of the mail document sender. The present invention, however, is not limited to this, but a GPS (Global Positioning System) receiver of a relatively low positioning accuracy may be incorporated to obtain latitudinal and longitudinal information on the current position.

In addition, the present invention can also be easily implemented with a digital portable telephone system or other systems if a digital mobile communication system and its terminals that can transmit and receive mail documents are used instead of the PHS and its terminals.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the radio communication system has been described, but the present invention is not limited to this, but a system for transmitting mails via a wired line may be used.

According to one aspect of the present invention, there is provided a communication device comprising document input means for inputting document data, area-specific information obtaining means for obtaining area-specific information corresponding to the current position, and transmission control means for attaching the area-specific information obtained by the area-specific-information obtaining means to the document data input by the document input means.

With this configuration, the area-specific information such as the image corresponding to the area where the sender is located is automatically attached to the mail document for transmission, whereby the mail document imparted with the area-specific information suitable for the area can be easily transmitted without the needs for much time and labor.

The above described area-specific information obtaining means may obtain positional information based on the identification information on the nearest cell station which is obtained by radio and select one of plural previously-provided pieces of area-specific information which corresponds to the above described positional information.

With this configuration, in addition to the above described effects, the area-specific information is selected based on the identification information automatically obtained by the device as it moves. This configuration eliminates the needs for any other special positioning means or the like and avoids complicating the configuration of the circuit.

The above described area-specific information obtaining means may obtain the area-specific information corresponding to the nearest cell station from this cell station by radio.

With this configuration, in addition to the above described effects, the device need not have a large amount of area-specific information, thereby enabling the scale of the circuit of the device to be reduced.

According to another aspect of the present invention, there is provided a communication system in which a communication terminal transmits document data or the like to a destination terminal via a service station connected to a service center, wherein the communication terminal comprises input means for inputting document data, commanding means for commanding that area-specific information indicating the current position be added to the document data, and means for specifying a destination of the document data, the communication terminal transmitting the document data, command information, and destination information to the service center, and wherein the service center comprises means for storing plural pieces of area-specific information, selecting, based on the command information, one of the plural pieces of area-specific information which corresponds to the command information, attaching the selected area-specific information to the received document data, and transmitting the document data to a communication terminal specified by the destination information.

With this system configuration, the communication terminal attaches to the mail document the command information commanding the addition of the area-specific information corresponding to the area where the sender is located, and the service center, which relays the mail document, attaches the area-specific information such as the image which corresponds to the command, to the mail document for transmission. Consequently, the communication terminal can easily transmit mail documents and do not require a memory or the like for storing a large number of images, thereby enabling the scale of the circuit to be reduced. On the other hand, the service center can easily appeal the contents of its services to service users by, for example, varying the area-specific information on the same area depending on the season.

The above described command information may be the positional information obtained by the communication terminal and indicating the current position thereof.

With this system configuration, in addition to the above described effects, the service center can easily obtain the area-specific information from the positional information.

The above described command information may be the positional information obtained by the service center and indicating the current position of the communication terminal.

With this system configuration, in addition to the above described effects, the communication terminal needs to create no special command information and the required operation can be preformed only by the service center, thereby facilitating new service settings or the like.

What is claimed is:

1. A radio communication system comprising:
   a communication terminal; and
   a service center connected to said communication terminal via a radio channel,
   wherein said communication terminal comprises:
      a mail creation unit which creates an electronic mail to be sent to an addressee;
      a detecting unit which detects a current position of the communication terminal; and
      a transmission unit which attaches position information indicating the current position detected by the detecting means to the electronic mail and transmits the electronic mail with the position information attached thereto to the service center, and
   wherein said service center comprises:
      a storage unit which stores a plurality of items of regional image information, said plurality of items of regional image information comprising a plurality of images of respective different regional areas;
      a reading unit which reads from said storage unit one of said plurality of items of regional image information that corresponds to the position information attached to the electronic mail, and which attaches the read item of regional image information to the electronic mail; and
      a transmitter which transmits the electronic mail with the regional image information attached thereto to the addressee.

2. The system according to claim 1, wherein said storage unit stores at least one of scenic images of the respective different regional areas, logo marks of the respective different regional areas, and advertisement images corresponding to the respective different regional areas as the regional image information.

3. The system according to claim 1, wherein said storage unit comprises a read-only memory.

4. The system according to claim 1, wherein said storage unit comprises a rewritable memory, and wherein externally supplied information is written to said rewritable memory.

5. The system according to claim 1, wherein the communication terminal further comprises:
   a receiver which receives electronic mail with regional image information attached thereto that is transmitted from another device; and
   a display which displays the received electronic mail and the received regional image information with the received regional image information superimposed on a part of the received electronic mail.

6. The system according to claim 5, wherein the regional image information comprises one of a scene image and a logo mark.

* * * * *